(12) United States Patent
Di Nello (10) Patent No.: US 9,603,339 B2
(45) Date of Patent: Mar. 28, 2017

(54) PIG FEEDER

(71) Applicant: Hugo Daniel Di Nello, Chañar Ladeado (AR)

(72) Inventor: Hugo Daniel Di Nello, Chañar Ladeado (AR)

( * ) Notice: Subject to any disclaimer, the term of this patent is extended or adjusted under 35 U.S.C. 154(b) by 7 days.

(21) Appl. No.: 14/408,477

(22) PCT Filed: Jun. 11, 2013

(86) PCT No.: PCT/IB2013/054766
§ 371 (c)(1),
(2) Date: Apr. 13, 2015

(87) PCT Pub. No.: WO2013/190425
PCT Pub. Date: Dec. 27, 2013

(65) Prior Publication Data
US 2015/0216141 A1    Aug. 6, 2015

(30) Foreign Application Priority Data

Jun. 19, 2012    (AR) .............................. 20120102180

(51) Int. Cl.
*A01K 5/00*    (2006.01)
*A01K 5/02*    (2006.01)

(52) U.S. Cl.
CPC .................................. *A01K 5/0225* (2013.01)

(58) Field of Classification Search
CPC .......... A01K 5/01; A01K 5/0107; A01K 5/02; A01K 5/0225; A01K 5/0275; A01K 5/0283; A01K 5/00; A01K 1/10; A01K 1/105

USPC .......... 119/52.4, 53, 57, 58, 52.1, 51.01, 60, 119/61.1, 61.2

See application file for complete search history.

(56) References Cited

U.S. PATENT DOCUMENTS

| | | | | |
|---|---|---|---|---|
| 5,036,798 A | * | 8/1991 | King | A01K 5/0241 119/53.5 |
| 5,351,649 A | * | 10/1994 | Rovira Badia | A01K 5/0225 119/53.5 |
| 5,570,656 A | * | 11/1996 | Waldner | A01K 5/0225 119/53 |

(Continued)

FOREIGN PATENT DOCUMENTS

| | | |
|---|---|---|
| AR | 086161 A1 | 11/2013 |
| ES | 1040934 U | 6/1999 |

(Continued)

OTHER PUBLICATIONS

Foreign communication from the priority application—International Search Report and Written Opinion, PCT/IB2013/054766, Sep. 25, 2013, 11 pages.

*Primary Examiner* — Daniel J Troy
*Assistant Examiner* — Hiwot Tefera
(74) *Attorney, Agent, or Firm* — Conley Rose, P.C.; Rodney B. Carroll (57) ABSTRACT

A pig feeder of the type comprising an inverted trapezoid-shaped hopper in which the supply of feed-to-be-dosed is loaded, which is easy to adjust by means of a single control unit that acts at the same time on both edges of the lower tray, which serves as an adjusting feed dosing gate, for which purpose a synchronism bar is provided in the upper part, which further enables an accurate readout of the dosing aperture position of the feeder by means of a rotating pointer.

3 Claims, 4 Drawing Sheets

(56) References Cited

U.S. PATENT DOCUMENTS

| | | | | |
|---|---|---|---|---|
| 5,603,285 | A * | 2/1997 | Kleinsasser | A01K 5/0225 119/53 |
| 5,640,926 | A * | 6/1997 | Kleinsasser | A01K 5/0225 119/53 |
| 5,921,200 | A * | 7/1999 | Bondarenko | A01K 5/0225 119/52.1 |
| 6,269,770 | B1 * | 8/2001 | Bondarenko | A01K 5/0225 119/53 |
| 8,800,491 | B2 * | 8/2014 | Adermann | A01K 5/0225 119/53 |
| 8,899,178 | B2 * | 12/2014 | Bondarenko | A01K 5/0225 119/53.5 |
| 8,939,109 | B2 * | 1/2015 | Kleinsasser | A01K 5/00 119/53.5 |
| 2004/0083979 | A1 * | 5/2004 | Bondarenko | A01K 5/0225 119/53.5 |
| 2008/0276873 | A1 * | 11/2008 | Waldner | A01K 5/0216 119/51.5 |
| 2010/0180825 | A1 * | 7/2010 | Kleinsasser | A01K 5/0225 119/53 |
| 2011/0297092 | A1 * | 12/2011 | Lato | A01K 5/0225 119/53 |
| 2013/0098299 | A1 * | 4/2013 | Adermann | A01K 5/0225 119/53 |
| 2014/0130746 | A1 * | 5/2014 | Kleinsasser | A01K 5/0225 119/51.5 |
| 2014/0251221 | A1 * | 9/2014 | Adermann | A01K 5/0225 119/53 |

FOREIGN PATENT DOCUMENTS

| | | |
|---|---|---|
| FR | 2560001 A1 | 8/1985 |
| KR | 200188530 Y1 | 7/2000 |
| WO | 2013190425 A1 | 12/2013 |

* cited by examiner

PIG FEEDER

CROSS REFERENCE TO RELATED APPLICATIONS

This application is a filing under 35 U.S.C. 371 of International Application No. PCT/IB2013/054766 filed Jun. 11, 2013, entitled "Pig Feeder," which claims priority to Argentine Patent Application No. 20120102180 filed Jun. 19, 2012, which applications are incorporated by reference herein in their entirety.

BACKGROUND OF THE INVENTION

Field of the Invention

The present invention relates to the field of devices, apparatuses and arrangements used in animal feeding, more particularly to the devices used as feeders for pig and other animal feeding.

Prior Art

To better understand the object and scope of the present invention, it is convenient to describe the closest state of the art that is known about the use of pig and other similar animal feeders, and thus demonstrate the novel and inventive features of this new pig feeder.

As it will be apparent to those skilled in the art, the correct feed dosing for pigs in their various developmental stages is essential to yield healthy and highly-productive animals. Generally, the lack of energy feeds in pigs reduces the rate of food conversion and slows down growth; conversely, excessive energy feeds produce too much fat. This need of providing an appropriate feeding regime is not exclusive to pigs, but is also applicable to any type of livestock, thus, the teachings drawn from what is described and disclosed herein, may be extended beyond pigs as expressly made herein.

In modern pig farming, where a controlled pig feeding program is desired, special pig feeders are used, which provide an adequate feed dosing adjustment, either of liquid and/or dry feed. In general, the type of feeder unit relevant to the present invention comprises an overhead hopper in which balanced food is placed generally in the form of micro-pellets, or other type of grain that is adequate for feeding, including, but not limited to corn and soybean.

Such hopper, where it has a generally inverted trapezoid shape, often referred to as inverted rectangular pyramid trunk, has a long rectangular discharge outlet on its bottom that is blocked to a greater or lesser extent by a generally rectangular first tray or gate that allows to increase or reduce the size of the aperture through which the feed flows towards a collection tray on the ground where the pigs feed. The tray or gate moves upwardly and downwardly supported by a set of height-adjustable supports or bars that support and guide their furthest ends in an independent manner.

For reference purposes, a clear example of this arrangement may be observed in utility model ES1040934U, wherein the adjustable supports hold both ends of a generally rectangular tray proximal to the discharge outlet of the hopper. This type of arrangement used until now must be adjusted from both ends, by tightening and loosening both screws to move up or down both ends of the tray in an independent manner.

This type of adjustment, in trapezoid-shaped hoppers, requires special skills on the part of the operator adjusting the feeder dosing, as the operator must constantly monitor the horizontality of the tray, tightening or loosening both adjusting screws sequentially, since the tray is supported independently from its furthest ends. This task requires a considerable amount of time and attention if an accurate adjustment of the feeder is desired, since the tray tends not to be completely parallel to the discharge outlet of the hopper, and thus in reality, it is very difficult to achieve a smooth descent of the tray that acts as a gate or shutter. This situation is not so difficult if the hopper is conical, as it is possible to achieve a simpler adjustment by actuating a small round-shaped discharge outlet in the center of the conical hopper, however, in the case of trapezoid-shaped hoppers, the considerable length of the lower tray or gate has required until now the use of a double adjustment on both ends of the gate, just like the feeders currently available on the market exhibit.

There is thus a need for a new type of pig feeder that makes feed dosing easy and effective by using a new mechanism of adjustment of the block level of such first tray that acts as a gate against the discharge outlet of the hopper to avoid the above-mentioned drawbacks, mainly for the difficulty and time it takes to alternatively adjust both ends of the blocking gate of the discharge outlet of the hopper.

BRIEF DESCRIPTION OF THE INVENTION

It is an object of this invention to provide a pig feeder of the type comprising a feed hopper, that is capable of meeting the current market demands, in terms of capacity, robustness, availability to store dry and moistened feed and a water supply, which can be adjusted in the feed dosing in an effective and simple manner by means of a single manually-operated switch.

It is therefore an object of this invention to provide a pig feeder of the type comprising a horizontally elongated hopper of the type holding a movable gate from at least two ends with both supports such that it is possible to synchronize the descent of the gate and achieve an accurate and constant adjustment of the feed dosing throughout the entire length of the gate that acts as a first feeding tray. In order to achieve this object, the present invention provides for the adoption of a novel and inventive synchronism bar connected to a rotation actuating means of such synchronism bar, and that exhibits eccentric pivot means in proximity to each end of the synchronism bar itself, and allows to achieve such accurate and synchronized adjustment since the eccentric pivot means that are connected to the vertical supports holding the gate cause such synchronism bar to rotate, moving such movable gate upwardly or downwardly without this preventing other mechanisms from been added, but ensuring a uniform opening or aperture along the lower discharge outlet of the hopper where the food is stored.

Other objects of the examples of the present invention will become apparent from the detailed description of the invention and the claims attached hereto.

BRIEF DESCRIPTION OF THE DRAWINGS

For more clarity and deeper understanding of the object of the present invention, the invention is illustrated in several drawings, wherein the invention is shown in at least one preferred embodiment, all by way of example, wherein.

DETAILED DESCRIPTION OF THE INVENTION

Next, and with the objective of disclosing in a manner sufficiently clear how the feeder of the present invention can be carried out in practice, a detailed description of more than one preferred embodiment is provided herein. It should be noted, that the information herein disclosed allows those skilled in the art to carry out the present invention not only in the manner set forth in the following description or illustrated in the drawings, but also to carry out other embodiments equivalent to those herein described, thanks to the descriptions and drawings herein provided. Moreover, it is possible to extend the benefits derived from the use of this pig feeder to various new applications not necessarily illustrated in relation to these specifications.

Figure 1:
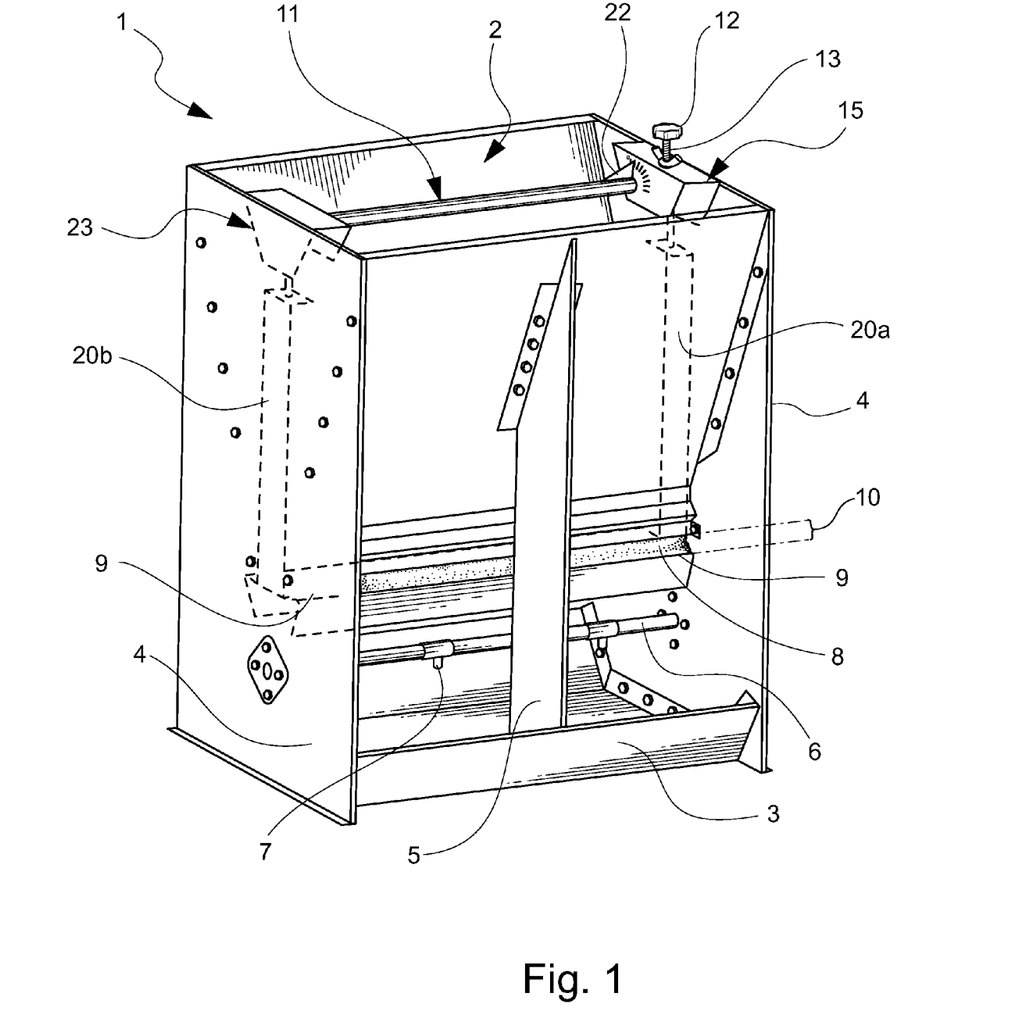
FIG. 1 is a perspective view of the pig feeder according to a preferred first embodiment, showing the general arrangement of the feeder.

FIG. 1 shows the general arrangement of a pig feeder (1) according to a preferred embodiment of the present invention comprising a horizontally elongated hopper (2) having an inverted trapezoid shape wherein a supply of feed is loaded to be then dosed or dispensed through the lower discharge outlet of such hopper. It should be noted that such hopper (2) has a big upper inlet through which it is possible to supply the balanced food for pigs, and a lower outlet of equal length but smaller section, through which the balanced food tends to flow downwardly by gravity.

The hopper (2) is held in its position above and generally centered relative to a lower collection tray (3). The lower collection tray (3) is conveniently covered on its lateral ends with a pair of side plates (4), which may also serve as side walls closing the hopper itself (2). It should be noted that the basic structure so far described may be carried out in practice in a convenient manner utilizing stainless steel sheets, mounting the various parts with screws and/or rivets, however, any other type of material and construction method may be used to carry out the invention in practice and this should not be construed as a drawback or limitation in relation to the present invention.

One or more pigs may feed, according to the size of the feeder, by approaching from both and/or one side of the feeder (1), in which case the partition (5) may help, for example, to maintain separate the head of two pigs that are feeding simultaneously from one of the sides of the feeder (1); concurrently the partition (5) helps to mechanically reinforce the hopper (2) structure.

This type of feeder allows for a water supply to be added without causing any inconvenience, this is achieved by means of a water pipeline (6), which incorporates a series of dispensing spouts (7), generally located underneath the discharge outlet of the hopper (2) and above the lower collection tray (3). In general the feed material (8) that is not used in the discharge outlet of the hopper flows down onto the lower tray (3), and if it is mixed with water coming from the water pipeline (6), such feed may be also eaten by the animal as porridge or moistened feed, therefore this type of feeder is frequently referred to as combined feeder, for combining with moistened feedstuff. Regardless of the type of arrangement, either for dry feed only, for moistened feed only or a combination thereof, it is possible to obtain the benefits of the present invention in accordance with the novel and inventive dosing adjustment mechanism that is described herein below.

First, it should be noted that after the feed material (8) is poured into the hopper (2), it tries to flow downward by gravity through the lower outlet of the hopper itself. In FIG. 1, the shape of the section of the discharge outlet of the hopper is generally rectangular, but the feed material does not fall directly onto the lower collection tray (3) as it is stopped by an intermediate tray that acts as a movable dosing gate (9).

Such movable gate (9) is capable of covering at least the free area of such lower discharge outlet of such hopper (2) and can move at least upwardly and downwardly, varying the gap space between the gate (9) and the discharge outlet of the hopper (2), thus determining the feed dosing aperture (10).

In particular, such movable gate (9) is supported from its edges by at least two supports (20a) and (20b), which preferably comprise vertical bars; namely, these bars may be made of metal plates, flats or metal sheets that are cut and folded at their edges as shown in the figures. As it is better visible in FIG. 2, the upper fold or flange of the supports (20a, 20b) enable an effective and simple connection through the support rods (19, 25).

Recent studies on pig feeding presented by leading subject-matter experts, like INTA (Instituto Nacional de Tecnologia Agropecuaria de Argentina—Argentine Institute of Agricultural Technology), have confirmed once again the paramount importance of an accurate adjustment of the feed dosing for animals during their various growth and finishing periods. It is therefore necessary to ensure an accurate control over the feed dosing (8), and in this regard such opening or aperture (10) becomes the key variable on which to act in order to adjust such feed dosing.

To this end, the feeder of the present invention incorporates in a convenient manner, a novel synchronism bar (11) coupled to a rotation actuating means that will be described herein below. The rotation actuating means will be described hereinafter, and its design is such that it is connected to such synchronism bar in such a way that it moves such bar, generating the synchronized motion of both ends of the gate (9). Therefore, from a general descriptive point of view, the present invention is essentially comprised of a novel synchronism bar (11) which is coupled to a rotation actuating means, which actuates the synchronism bar (11). Such rotation actuating means, as will be shown below, may vary its design but it actuates directly such synchronism bar, causing it to rotate. Furthermore, the synchronism bar (11) has eccentric pivot means (18, 24) at least positioned in the proximities of each of the edges of such synchronism bar (11), more preferably on the edges of such bar, and without any limitation to complement with other intermediaries, wherein such eccentric pivot means (18, 24) connect to such vertical supports (20a, 20b) in such a way that the rotation of such synchronism bar (11) causes the movable gate (9) to move at least upwardly and downwardly (9).

Figure 2:
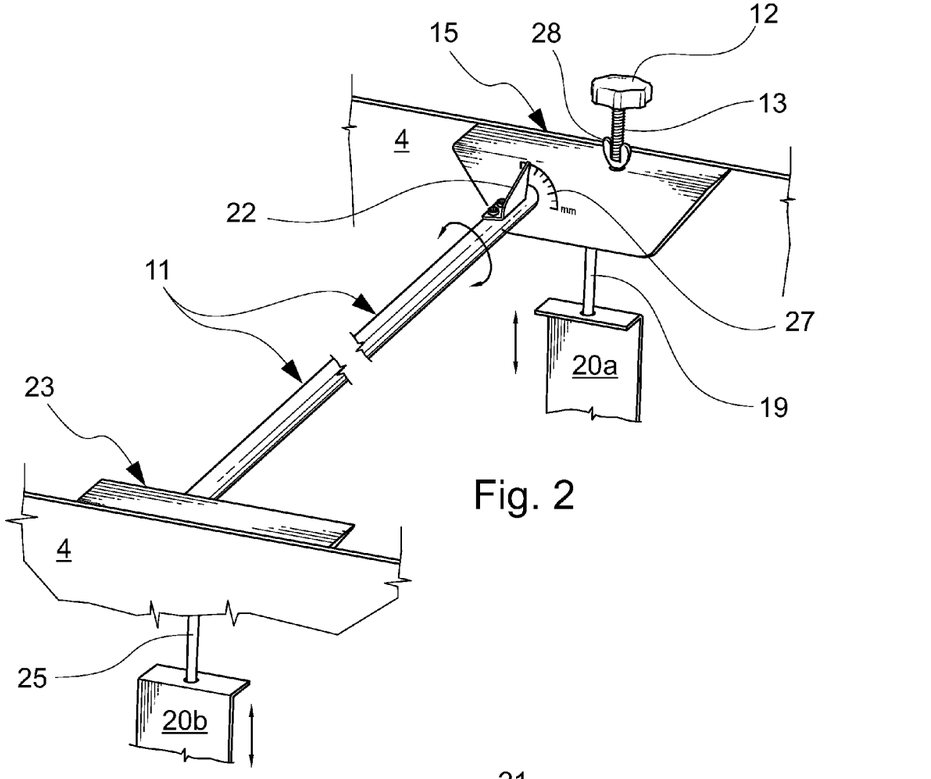
FIG. 2 is a partial and perspective view of the upper portion of the mechanism of adjustment for dry feed dosing, which shows both the control unit with a knob, and the driven unit on the opposite left end.
Figure 3:
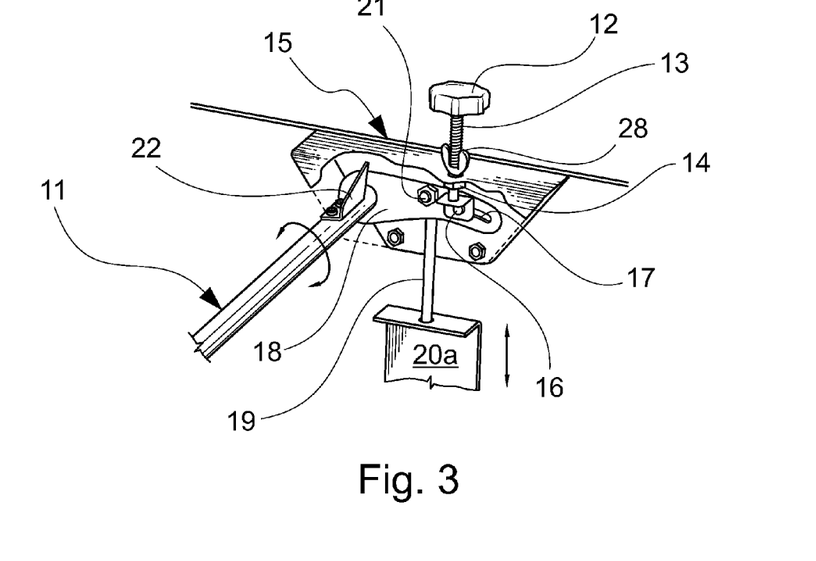
FIG. 3 is a partial and perspective view of the end portion of the control unit, which shows the internal components that allow to adjust the dosing of dry feed and at the same time indicate the opening position of the lower gate.

According to FIGS. 2 and 3, it can be seen that the feeder (1) of the present invention may be comfortably operated with one hand by the operator by turning a knob (12). However, it is worth noting that although a knob (12) like the one shown herein is preferably used, there is no limitation as to the type of convenient actuating means that can be used, in accordance with the convenience and comfort of operation of the user, including, without limitation, the use of levers and other manually, electrically or hydraulically-operated means, etc.

Figures 4, 5:
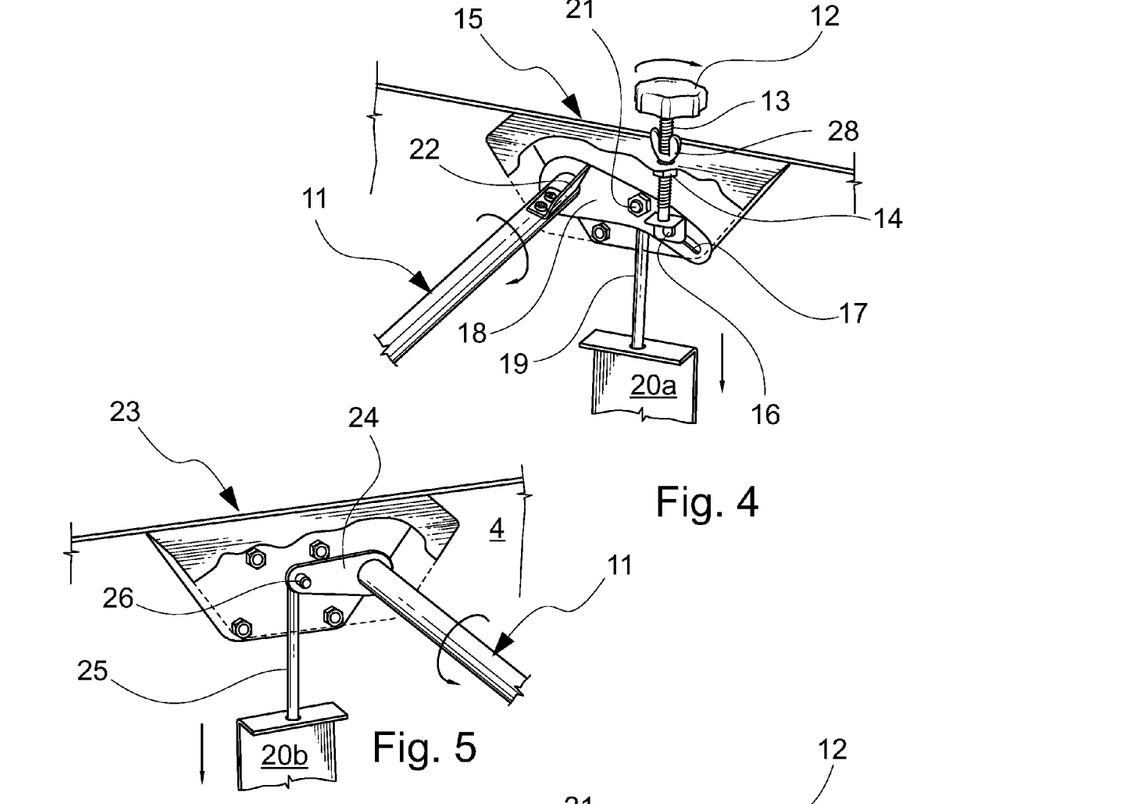
FIG. 4 is a partial and perspective view of the end of the control panel wherein the internal components may be seen with the same level of detail as in FIG. 3, with the feeder adjusted in a more open position.
FIG. 5 is a partial and perspective view of the driven end of the dosing adjustment mechanism, showing the internal components according to a first example of a preferred embodiment.

Such knob (12), according to a preferred design better shown in FIGS. 3 and 4, is attached to a threaded pin (13) in such a way that it allows the threaded pin (13) to rotate clockwise and anti-clockwise relative to a fixed nut (14) or threaded portion in the first control unit (15). Thus, the threaded pin (13) moves upwards and downwards at the operator's will, in such a way that in its lower end, thanks to the provision of a bolt (16) or other equivalent functional design, such as a short shaft or knuckle mechanism, acts as a drive means since it is conveniently attached to the end of such pin (13), in order to act as a drive shaft that slides along a guide bar (17). Such guide bar (17) is preferably practiced over a connecting rod (18) attached to the synchronism bar (11), preferably proximal to the control unit edge, in such a way that by turning the knob (12) in one direction or the other, causes the threaded pin (13) to rotate, move upwardly or downwardly, thus producing the rotation of the synchronism bar (11) because the connecting rod (18) is driven upward and downward from its farthest edge of the rotation shaft of the connecting rod due to the drive action of the drive means (16). Such knob (12) conveniently includes a threaded pin (13) and such drive means is a shaft (16) that is slidably inserted into such guide slide bar (17), causing a correlation between the upward and downward motion of such movable gate (9) and the movement of such knob (12). Preferably, such rotation actuating means of such synchronism bar (11) is preferably a non-back drive power transmission means, namely, a rotation actuating means that can be actuated from the side of the control unit that is operable by the operator, for example, by actuating the knob (12) to rotate the synchronism bar (11), without producing the antagonistic movement.

Such type of mechanisms may be selected from the set comprising a screw and a nut, a worm wheel and a ring gear, an eccentric cam and a cam follower, wherein such screw or worm wheel or such eccentric cam can rotate and act as a drive means, in a manner equivalent to the drive means (16) with the matching thread, ring gear or cam follower, as appropriate, in such a way that generally the latter are not capable of moving the mechanism into the opposite direction or reverse. Furthermore, and not withstanding this preferred arrangement, it is possible to complement with some locking means (28), like for example, a butterfly nut or any other equivalent lock element to help ensure the position set, and may also include a seal or padlock in order to prevent non-authorized personnel to change the adjustment set.

To summarize what has been stated above, in a preferred embodiment of the present invention, such rotation actuating means of such synchronism bar (11) includes at least one connecting rod (18) coupled to such synchronism bar (11), wherein such connecting rod (18) has a guide bar along which a drive means (16) slides, connected to a rotating knob (12). For this design, such rotation actuating means of such synchronism bar (11) includes a knob (12) such as to facilitate the manual operation by the operator performing the adjustment of the feeder.

Specifically, the pig feeder according to this invention comprises the followings features: a horizontally elongated hopper (2) having an inverted trapezoidal shape for receiving food for pigs to be dosed through a lower discharge outlet; a movable lower gate (9) suitable for cover a free discharge area of said lower discharge outlet, said movable lower gate (9) being supported by two vertical supports (20a, 20b) connected each to a respective farthest end of said movable lower gate (9); a rotary synchronism bar (11) having two eccentric pivot means (18, 24), each of said eccentric pivot means at each farthest end of said rotary synchronism bar (11), each of said eccentric pivot means being connected to one of said vertical supports so as to allow said movable lower gate (9) to move upwardly and downwardly by rotation of said rotary synchronism bar (11).

In combination with the above features, the pig feeder according to this invention also comprises the control unit (15) comprising a rotatable threaded pin (13), which is followed in a non-back way by a thread-following means (16) when rotates, and which particular embodiment may be varied according to the examples described above; wherein said thread-following means (16) is suitable to drive a rotation movement of said threaded pin (13) through one of said eccentric pivot means (e.g. (18) in FIG. 4) to the rotary synchronism bar (11), and wherein said rotatable threaded pin (13) has an univocal position and movement correlation with said rotary synchronism bar (11).

Any person skilled in the art will understand, the thread-following means (16) being a component as defined above having a driven/driver relationship with the threaded pin (13) wherein implicitly exists a non-back drive power transmission action from the threaded pin (13) towards the thread-following means (16), allowing a unidirectional control of the position and movement from knob (12) towards the rotary synchronism bar (11).

In this first embodiment of the present invention, as illustrated in FIGS. 3 to 5, and as it will be shown in more detail below, the connection of the connecting rods (18, 24) to the supports (20a, 20b) is a swivel connection and comprises a pivot point (21, 26) on both connecting rods such that the rotation of such synchronism bar (11) causes at least the movable gate to move upwardly or downwardly (9). It is thus observed that for the purposes of the present invention it is necessary to configure at least one eccentric pivot means proximal to each edge of such synchronism bar (11), wherein such eccentric pivot means connect to such vertical supports (20a, 20b), in such a way that the rotation of such synchronism bar (11) causes such movable gate to move at least upwardly and downwardly (9). It should be noted that such eccentric pivot means may in turn, comprise a more or less complex arrangement and as it will be further explained herein below with some additional exemplary embodiments in FIGS. 6 to 8, they nonetheless enable the synchronized upward and downward motion of both ends of the gate (9), through the rotation of the synchronism bar (11).

To wit, the rotation of the connecting rod (18) causes the support (20a) to move up or down in the portion corresponding to the control unit that can be referenced as the farthest right portion in FIG. 1. This is possible since the connecting rod articulates or pivots a support rod (19) of the support (20a), at a pivot point (21), which can be carried out in practice as in the figure, either by means of a pivot shaft, a threaded bolt or curved in a right angle of the edge itself of a cylindrical support rod (19) and/or similar arrangement.

Thus, the rotation of the connecting rod (18) causes not only the rotation of the synchronism bar (11) but also the upward and downward movement of the support (20a) and therefore the upward or downward movement of at least one of the edges of the gate (9).

It should be noted that for every angular position adopted by the connecting rod (18), there is an angular position of a pointer (22), which is better illustrated in FIGS. 3 and 4, which in turn show a specific height position of the gate (9) at the edge of the gate connected to the support (20a). It is therefore convenient to adopt a generally cylindrical shape for such synchronism bar (11), in such a manner as to include such pointer (22) that slides relative to a dial (27). It should be noted that while a generally cylindrical synchronism bar (11) is preferably adopted, and even more preferably a metal tube, nothing prevents such bar from adopting other shapes and materials, as long as they do not interfere with the overall operation of the feeder.

Thus, in order to make it clear how the gate (9) moves upward and downward in a controlled and even way to maintain a gap or aperture (10) that is generally constant along the entire length of the lower outlet of the hopper (2), FIG. 5 shows the driven portion (left portion of FIG. 1) of the feeder (1).

In such FIG. 5, a preferred manufacturing method of the driven unit is portrayed (23), for example, it may be made of fold sheet, wherein the synchronism bar (11) can rotate exactly as it does in the pivoting end in the control portion (right portion of FIG. 1).

However, in such driven unit (23), the synchronism bar (11) is the one that drives the rotation from the control unit in such a way as to cause the rotation of the connecting rod (24).

The driven connecting rod (24) pivots relative to the rotation shaft of the synchronism bar (11) keeping the same lever arm on both ends of the bar, taking into account the pivot points (16, 26) of both rods (19, 25). Thus, the synchronism in the upward and downward movement of both ends of the gate (9) is achieved. This is possible since the lever arm defined by the distance between such pivot points (21, 26) relative to the rotation shaft of the synchronism bar (11) is the same for each eccentric pivot means, whether it consists of a connecting rod and/or functionally equivalent pieces for the purposes of the present invention.

Thus, by a simple operation of the knob (12), a synchronized and controlled upward or downward movement of the gate (9) occurs. Such gate (9) that serves as the first tray on which the feed stored in the hopper (2) falls, after being gauged by the manufacturer, maintains an accurate alignment relative to the lower outlet of the hopper (2), in such a manner as to provide the user of the feeder with an adequate and quick control of the desired feed dosing.

The precise dosing position is easy to read by the operator, as the rotation of the synchronism bar (11) allows the pointer (22) to move, which indicates the position of the gate (9) on a dial indicator (27) in convenient units of measurement, like millimeters of aperture of the hopper base. Preferably, the measurement of the aperture (10) in millimeters is a convenient and useful measure for the purposes of the present invention, even more so when both ends of the gate are synchronized in such a special way.

It should therefore be noted that if this first embodiment of the present invention is constructively analyzed, such rotation actuating means according to this preferred design, includes an actuating knob (12), and together with such eccentric pivot means (18), such pointer (22) and such dial (27) all are mounted together towards one of the ends of such synchronism bar (11) that is supported in a control unit (15) and in the adjacencies of an end edge of such hopper (2).

In the meantime, the opposite edge of such synchronism bar (11) also comprises at least one eccentric pivot means (24) and is supported on a driven unit (23) in the adjacencies of the opposite end edge of such hopper (2).

Figure 6:
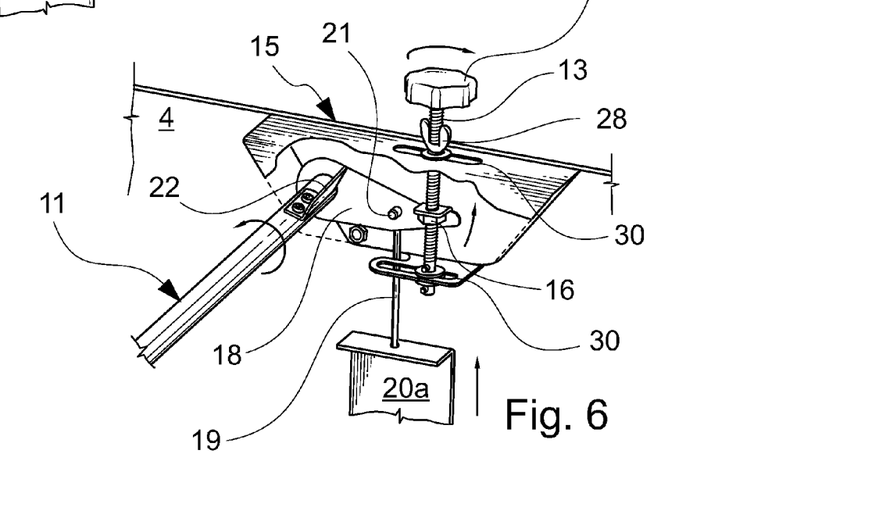
FIG. 6 is a partial and perspective view of the end portion of the control unit, showing the internal components in a second example of a preferred embodiment, with the feeder adjusted in an intermediate position.

Additionally, and as it will be apparent to those skilled in the art, a second embodiment of the present invention is provided in FIG. 6, which specifically illustrates the control unit (15), wherein the adjustment can also be made by turning a simple knob (12). This variation of the proposed design, also includes a threaded pin (13), but here instead of moving upwardly or downwardly, such pin rotates like a worm gear (13). The rotation of the worm gear causes the drive means (16) to move upwardly or downwardly, which in this case can be a fixed nut or threaded bushing welded to the edge of the connecting rod (18). Thus, and in a manner equivalent to the first embodiment described herein, the rotation of the connecting rod (18) causes the synchronism bar to rotate (11) and thus transfers the motion towards the driven portion that can be of the same type as that illustrated in FIG. 5.

Some construction details of this second embodiment of the present invention shown in FIG. 6 comprise sliding grooves (30) towards the edges of the worm gear (13) so as to enable adjustments along the inclination of the worm gear itself (13), where appropriate, for example when the nut (16) is not a pivot nut. As any person skilled in the art may infer from the designs so far described, other variations, complements and locks (28) can be added, as long as they do not affect the special functioning proposed for this special feeder.

Figure 7:
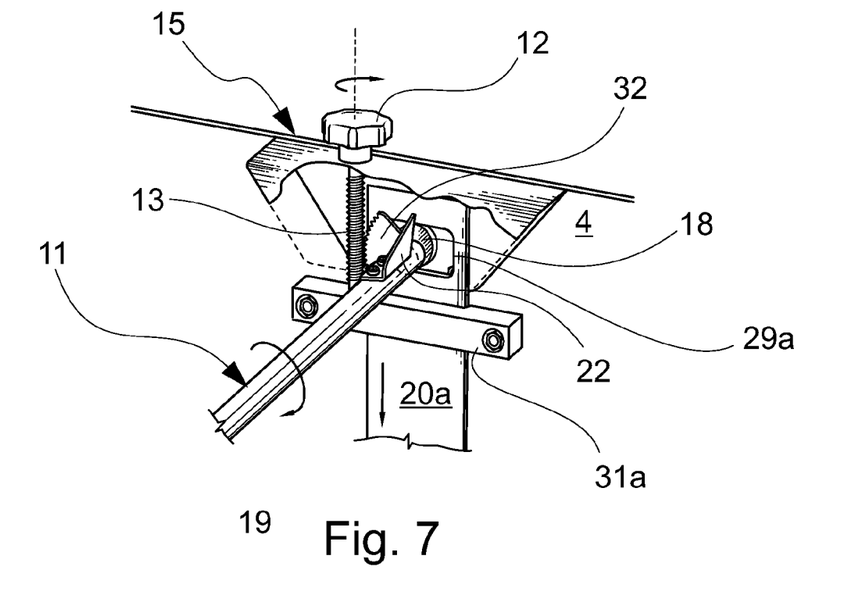
FIG. 7 is a partial and perspective view of the end portion of the control unit, showing the internal components in a third embodiment of the invention, with the feeder adjusted in a closed position.
Figure 8:
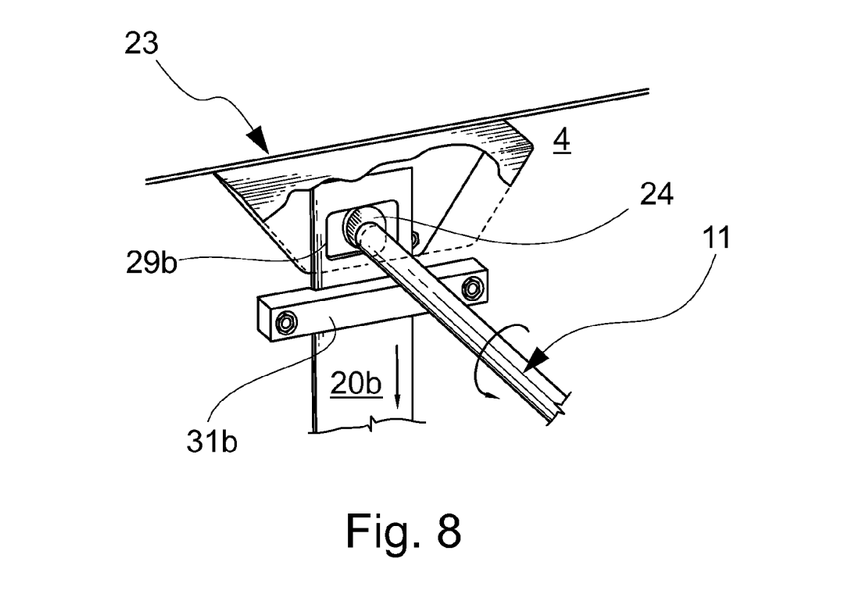
FIG. 8 is a partial and perspective view of the driven end of the mechanism of dose adjustment, showing the internal components, according to an embodiment that fits well for the type of design adopted for FIG. 7.

Finally and with the intention of further contributing to a clearer understanding of the nature and scope of this invention, a third embodiment of the mechanism of adjustment is provided in FIGS. 7 and 8.

In these figures, the control unit is conveniently illustrated (15) in FIG. 7, and the driven unit (23) in FIG. 8; being in both units where both ends of such synchronism bar are supported (11). The synchronism bar (11) has at both ends an eccentric cam (18, 24). Such cams can rotate jointly with such synchronism bar (11) and fit inside both housings (29a, 29b) of the corresponding supports (support) (20a, 20b), in such a way that the rotation of the bar (11) causes the supports (20a y 20b) to move upwardly and downwardly. In this variation of the design, it is possible to guide the supports through slide bars (31a, 31b).

The pointer (22) can be incorporated like in the previous designs, and the rotation actuating means of such synchronism bar (11) is carried out through the combination of a worm gear (13) that is tied to a portion of the ring gear (32) or even a complete gear. When the operator turns the knob (12), the synchronism bar (11) rotates and the gate (9) moves upwardly and downwardly, like previously described in all the examples.

In the light of the descriptions and illustrations provided herein above, it can be noted that this particular pig feeder differentiates and distinguishes from the prior art known, thus allowing to obtain significant benefits in terms of accuracy and ease of adjustment of the feed dosing due to its features, which are reflected in the following claims.

Having thus described and determined in particular the nature of this invention, and at least one way of carrying out this invention, the exclusive ownership and title to this invention are claimed as follows:

1. A pig feeder comprising:
    a horizontally elongated hopper (2) having an inverted trapezoidal shape for receiving food for pigs to be dosed through a lower discharge outlet,
    a movable lower gate (9) suitable to cover a free discharge area of said lower discharge outlet, said movable lower gate (9) being supported by two vertical supports (20*a*, 20*b*) connected each to a respective farthest end of said movable lower gate,
    a rotary synchronism bar (11) having two eccentric pivot means (18, 24), each of said eccentric pivot means at each farthest end of said rotary synchronism bar (11), each of said eccentric pivot means being connected to one of said vertical supports so as to allow said movable lower gate (9) to move upwardly and downwardly by rotation of said rotary synchronism bar (11),
    a control unit (15) comprising a rotatable threaded pin (13), and
    a thread-following means (16) suitable to drive a rotation movement of said threaded pin (13) through one of said eccentric pivot means (18) to the rotary synchronism bar (11),
    wherein said rotatable threaded pin (13) has an univocal position and movement correlation with said rotary synchronism bar (11).

2. The pig feeder of claim 1, wherein said rotatable threaded pin (13) includes a knob (12) attached thereto.

3. The pig feeder of claim 2, wherein said synchronism bar (11) is generally cylindrical and includes a pointer (22) that slides relative to a dial indicator (27).

* * * * *